United States Patent
Suzuki et al.

(10) Patent No.: US 6,815,124 B2
(45) Date of Patent: Nov. 9, 2004

(54) GEL ELECTROLYTE AND NONAQUEOUS ELECTROLYTE BATTERY

(75) Inventors: Yusuke Suzuki, Miyagi (JP); Mashio Shibuya, Fukushima (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 09/879,753

(22) Filed: Jun. 12, 2001

(65) Prior Publication Data

US 2002/0119377 A1 Aug. 29, 2002

(30) Foreign Application Priority Data

Jun. 16, 2000 (JP) .................................... P2000-182276

(51) Int. Cl.$^7$ ................................................. H01M 6/14
(52) U.S. Cl. ........................ 429/303; 429/316; 429/317; 429/309; 429/311; 429/231.4; 429/231.8; 429/231.1
(58) Field of Search ................................ 429/303, 316, 429/317, 309, 311, 231.4, 231.8, 231.1

(56) References Cited

FOREIGN PATENT DOCUMENTS

| EP | 0601754 | 6/1994 |
|---|---|---|
| EP | 0999223 | 5/2000 |
| JP | 62260806 | 11/1987 |
| JP | 2000-215917 | * 8/2000 |
| WO | WO 99/05191 | * 2/1999 |

* cited by examiner

*Primary Examiner*—Laura Weiner
(74) *Attorney, Agent, or Firm*—Sonnenschein Nath & Rosenthal LLP

(57) ABSTRACT

A gel electrolyte in which nonaqueous electrolyte solution obtained by dissolving electrolyte salt containing Li in a nonaqueous solvent is gelled by a matrix polymer including a copolymer as a main component which contains vinylidene fluoride as a monomer unit. The copolymer employed as the matrix polymer is carboxylic acid modified polyvinylidene fluoride into which a structure formed by esterifying a part or all of a carboxyl group, a carboxylic acid or an acetic anhydride structure is introduced. The carboxylic acid modified polyvinylidene fluoride can dissolve and retain therein a solvent of low viscosity having a low boiling point. Therefore, the carboxylic acid modified polyvinylidene fluoride is used as a matrix polymer to improve the ionic conductivity of the gel electrolyte at low temperature. Thus, a low temperature characteristic is improved and a cyclic characteristic and a load characteristic are also improved.

14 Claims, 3 Drawing Sheets

GEL ELECTROLYTE AND NONAQUEOUS ELECTROLYTE BATTERY

RELATED APPLICATION DATA

The present and foregoing application claim priority to Japanese Application No. P2000-182276 filed Jun. 16, 2000. All of the foregoing applications are incorporated herein by reference to the extent permitted by law.

BACKGROUND OF THE INVENTION

1. Field of the Invention

The present invention relates to a gel electrolyte obtained by gelling nonaqueous electrolyte solution and more particularly to a nonaqueous electrolyte battery using the gel electrolyte.

2. Description of Related Art

In these days, batteries have industrially occupied important positions as the power sources of portable electronic devices. In order to realize the compact and light devices, it has been necessary to reduce the weight of the batteries and efficiently employ accommodation spaces in the devices. Lithium batteries high in their energy density and output density are most suitable for meeting the above described demand.

Although a battery high in degree of freedom for its configuration, a thin sheet type battery with a large area and a thin card type battery with a small area have been demanded among many batteries, it has been difficult to manufacture a thin battery with a large area by a conventional method for using a metallic can as an outer casing.

In order to solve this problem, batteries using gel electrolyte which employ organic or inorganic solid electrolyte or polymer gel have been studied. These batteries are characterized in that the electrolyte is stabilized, the thickness of the electrolyte is fixed and an adhesive strength exists between an electrode and the electrolyte to maintain a contact force. Therefore, it is not necessary to seal electrolyte solution by a metallic outer casing or to exert pressure on a battery element. As a result, a film type outer casing can be used to make a battery thin.

However, an all-solid electrolyte is low in its ionic conductivity so that it is difficult to actually utilize it for manufacturing a battery. Accordingly, the gel electrolyte is currently considered to be important.

As the outer casing, a multilayer film composed of a polymer film or a metallic thin film or the like may be employed. Specially, a moisture-proof multilayer film composed of a heat sealing resin layer and a metallic foil layer is desirable as a candidate of an outer casing material, because the moisture-proof multilayer film can easily realize a sealed structure by a hot seal, is excellent in strength airtightness of the multilayer film itself and lighter, thinner and more inexpensive than the metallic outer casing.

As matrix polymers used for the gel electrolyte, there are known polyether compounds such as polyethylene oxide, polyacrylonitrile (PAN), polyvinylidene fluoride (PVdF), polymethyl methacrylate, or the like. Especially, since the gel electrolyte can be simply manufactured by using the mixture of the PVdF and a nonaqueous solvent and electrolyte, heating and cooling the mixture, dissolving the mixture in a diluent solvent and then volatilizing the solvent, and further, the PVdF is excellent in its electrochemical stability, the PVdF is preferable as the matrix polymer.

On the other hand, as the nonaqueous solvents, ethylene carbonate (EC) and propylene carbonate (PC) are electrochemically stable, high in their dielectric constant, and useful. In this case, the EC has a melting point as high as 38° C. Further, the PC has a viscosity as high as 2.5 mPas, so that the ionic conductivity at low temperature is disadvantageously deteriorated.

Thus, for the purpose of solving the above described problem, solvents with low viscosity are used in an ordinary lithium-ion battery. As the solvents with low viscosity, straight chain carbonates such as dimethyl carbonate (DMC), ethylmethyl carbonate (EMC) and diethyl carbonate (DEC), or the like are widely employed, because they are electrochemically stable. The viscosity of the solvents with low viscosity is as low as 0.6 mPas to 0.8 mPas. The melting point of the dimethyl carbonate (DMC) is 3° C., that of the ethylmethyl carbonate (EMC) is −55° C., and that of the diethyl carbonate (DEC) is −43° C. Accordingly, these carbonates are used for the gel electrolyte at the same time, so that it is anticipated that the ionic conductivity of the gel electrolyte can be improved at low temperature.

However, when the PVdF is used as the matrix polymer, in case these solvents with low viscosity are employed together, a serious problem will be generated in view of gelling. Specifically, although the polyvinylidene fluoride (PVdF) has a compatibility to some degree with the solvents having the high dielectric constant such as the EC, PC, or the like, it has a low compatibility with the solvents of low viscosity such as the DMC, EMC, DEC, or the like. Therefore, when these solvents of low viscosity are employed together with the PVdF, a stable gel electrolyte cannot be undesirably formed.

Accordingly, in the gel electrolyte using the PVdF as the matrix polymer, it is difficult to use the solvents of low viscosity together with the PVdF. Consequently, the ionic conductivity of the gel electrolyte at low temperature is inconveniently inferior to that of electrolyte solution.

SUMMARY OF THE INVENTION

The present invention was devised by taking the above described problems into consideration and it is an object of the present invention to provide a gel electrolyte good in its ionic conductivity at low temperature even when polyvinylidene fluoride (PVdF) is used as a matrix polymer and further provide a nonaqueous electrolyte battery excellent in its battery property at low temperature.

The inventors of the present invention carried on various studies and examinations for a long period, and after that, they found that a partly carboxylic acid modified copolymer obtained by copolymerizing, for instance, maleic acid with vinylidene fluoride is excellent in compatibility with a straight chain carbonate, chemical stability, strength of gel and a liquid retaining property and useful for the matrix polymer of the gel electrolyte.

The present invention is completed in accordance with the above mentioned knowledge. According to one aspect of the present invention, there is provided a gel electrolyte in which nonaqueous electrolyte solution obtained by dissolving electrolyte salt containing Li in a nonaqueous solvent is gelled by a matrix polymer including a copolymer as a main component which contains vinylidene fluoride as a monomer unit, wherein at least one kind of structure selected from structures formed by esterifying a part or all of a carboxyl group or a carboxylic acid, or an acetic anhydride structure is introduced into the copolymer.

Further, according to another aspect of the present invention, there is provided a nonaqueous electrolyte battery comprising: an anode and an anode and a gel electrolyte in which nonaqueous electrolyte solution obtained by dissolving electrolyte salt containing Li in a nonaqueous solvent is gelled by a matrix polymer including a copolymer as a main component which contains vinylidene fluoride as a monomer unit, wherein at least one kind of structure selected from structures formed by esterifying a part or all of a carboxyl group or a carboxylic acid, or an acetic anhydride structure is introduced into the copolymer.

Since the polyvinylidene fluoride (PVdF) is low in its compatibility with a solvent of low viscosity, a stable gel electrolyte is hardly manufactured when the PVdF is employed as it is. On the contrary, carboxylic acid modified PVdF (at least one kind of structure selected from a structure obtained by esterifying a part or all of carboxyl group or carboxylic acid, or acetic anhydride is introduced) can dissolve a solvent of low viscosity having a low boiling point therein and retain the liquid thereof. Therefore, the carboxylic acid modified PVdF (polyvinylidene fluoride) is employed as the matrix polymer, so that the ionic conductivity of the gel electrolyte is improved at low temperature.

Further, in the nonaqueous electrolyte battery using the above described gel electrolyte, the improvements of a current characteristic and a low temperature characteristic can be realized while the advantages of a polymer battery such as no leakage of liquid, a light and compact form or the like are maintained, since an outer casing can be made of a laminate film.

BRIEF DESCRIPTION OF THE DRAWINGS

The object and other objects and advantages of the present invention will appear more clearly from the following specification in conjunction with the accompanying drawings in which.

DETAILED DESCRIPTION OF THE PREFERRED EMBODIMENT

Now, referring to the accompanying drawings, a gel electrolyte and a nonaqueous electrolyte battery to which the present invention is applied will be described below in detail.

The gel electrolyte to which the present invention is applied serves as an ion conductor between a cathode active material layer and an anode active material layer and is obtained in such a manner that nonaqueous electrolyte solution having electrolyte salt including Li dissolved in a nonaqueous solvent is caused to be gelled by a matrix polymer.

Here, as the nonaqueous solvent, is employed such a nonaqueous solvent which includes, as solvents of low viscosity, 1 wt % or more of one kind or more materials selected from the group consisting of dimethyl carbonate (DMC), ethyl methyl carbonate (EMC), diethyl carbonate (DEC), ethyl propyl carbonate (EPC), methyl propyl carbonate (MPC), dipropyl carbonate (DPC), and ethyl butyl carbonate (EBC) relative to all solvents and one kind or more materials selected from the group consisting of ethylene carbonate (EC), propylene carbonate (PC), gamma butyrolactone (GBL), and dimethoxyethane (DME) as main solvents.

Further, as the electrolyte salt, Lithium salt selected from between $LiPF_6$, $LiBF_4$, $LiN(C_2F_5SO_2)_2$, $LiN(CF_3SO_2)_2$, or the like. These electrolyte salts are desirably added to the above described nonaqueous solvent so that the concentration of lithium ions ranges from 0.4 mol/kg to 1.7 mol/kg relative to the nonaqueous solvent.

The gel electrolyte to which the present invention is applied is greatly characterized in that it makes use of a carboxylic acid modified copolymer as a matrix polymer including vinylidene fluoride (VdF) as a monomer unit.

The carboxylic acid modification is realized by introducing either a structure obtained by esterifying a part or all of a carboxyl group, a carboxylic acid or an acetic anhydride structure into the principal chain or the side chain of a copolymer.

More specifically, the copolymer into which at least one kind of structure selected from among structures expressed by the following chemical formulae 9 to 12 (here, R, $R_1$, or $R_2$ respectively designates any one selected from the group consisting of H, $CH_3$, $C_2H_5$, $C_3H_7$, $C_4H_9$, and $C_5H_{11}$) is introduced to the principal chain or the side chain is employed as the matrix polymer.

[Chemical Formula 9]

[Chemical Formula 10]

[Chemical Formula 11]

[Chemical Formula 12]

The above described copolymer can retain solvents having low melting points and low viscosity such as dimethyl carbonate (DMC), ethylmethyl carbonate (EMC), diethyl carbonate (DEC), ethyl propyl carbonate (EPC), methyl propyl carbonate (MPC), dipropyl carbonate (DPC), and ethyl butyl carbonate (EBC) or the like. As a result, the melting point and the viscosity of electrolyte solution retained in the gel electrolyte can be lowered. Therefore, the gel electrolyte using such a copolymer as the matrix polymer is good in its ionic conductivity at low temperature.

In order to modify the copolymer by carboxylic acid, maleic acid, ester maleate, maleic anhydride, or the like may be employed together as the monomer units and they may be copolymerized with the vinylidene fluoride.

At this time, these monomer units are preferably copolymerized with the vinylidene fluoride so that the monomer unit ratio the above monomer units to the vinylidene fluoride ranges from 25/10000 to 30/1000. When the monomer unit ratio is smaller than 25/10000, an effect achieved by a carboxylic acid modification will be insufficient, and accordingly, a sufficient compatibility with the solvents of low viscosity may not be possibly obtained. On the contrary, when the monomer unit ratio exceeds 30/1000, a performance as the matrix polymer may be possibly deteriorated.

In this case, the optimum range of the monomer unit ratio is a little different depending on kinds of monomers to be copolymerized with the vinylidene fluoride. Accordingly, it is desired to suitably set the optimum range of the monomer unit ratio in accordance with the types of monomers to be used. For example, in the case of a copolymer obtained under the copolymerization of monomethyl maleate (MMM) produced by esterifying one carboxyl group of maleic acid by methanol with vinylidene fluoride, a suitable amount of copolymerization ratio the copolymer to the vinylidene fluoride may be set to 0.01% or more relative to the vinylidene fluoride in the monomer weight ratio. However, when the dissolution and affinity of straight chain carbonate are taken into consideration, the copolymerization ratio may be effectively set to 0.1% or more. While the rate of the monomethyl maleate (MMM) is desirably increased, it may be set to 10% or lower, preferably set to 5% or lower, because the polymerization undesirably becomes difficult and a water content including impurities serving as the serious impurities is liable to be contained in a lithium battery. The monomer unit ratio the monomethyl maleate (MMM) to the vinylidene fluoride ranges 1/2500 to 1/40.

In the case of ester maleates having different structures, for instance, monobutyl maleate, the optimum range of the monomer unit ratio ranges from 1.3% to 6.7% (in the monomer weight ratio).

The molecular weight of the above described copolymer is desirably located within a range of 0.8 dl/g to 3.0 dl/g on the basis of an intrinsic viscosity notation by considering the function of the copolymer as the matrix polymer.

Further, hexafluoropropylene (HFP) is desirably polymerized with the above described copolymer. At this time, the hexafluoropropylene (HFP) to be polymerized with the copolymer is preferably located within a range of 0.01% to 7.5% or 30% to 60% on the basis of weight ratio of the monomer relative to the vinylidene fluoride.

The gel electrolyte having the above described configuration can dissolve the solvents of low viscosity having low boiling points and retain liquid therein. Thus, the viscosity of the electrolyte solution contained in the gel electrolyte can be lowered and the ionic conductivity at low temperature can be improved.

The gel electrolyte is employed as, for example, the nonaqueous electrolyte of a nonaqueous electrolyte battery.

Now, the nonaqueous electrolyte battery to which the present invention will be described below.

Figure 1:
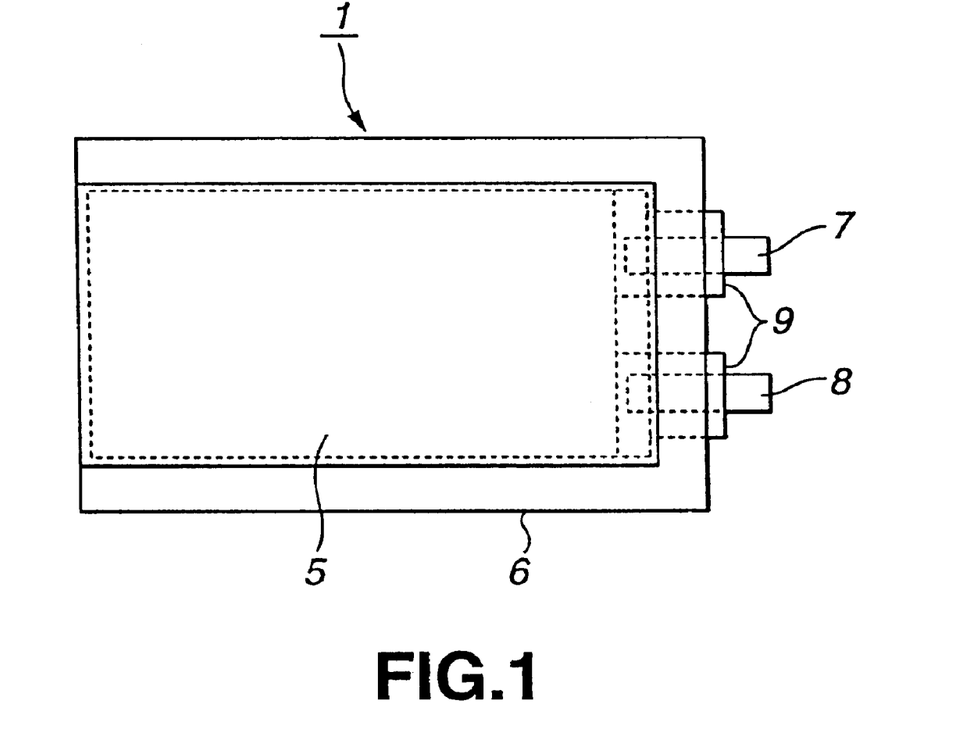
FIG. 1 is a schematic plan view showing one structural example of a nonaqueous electrolyte battery.
Figure 2:
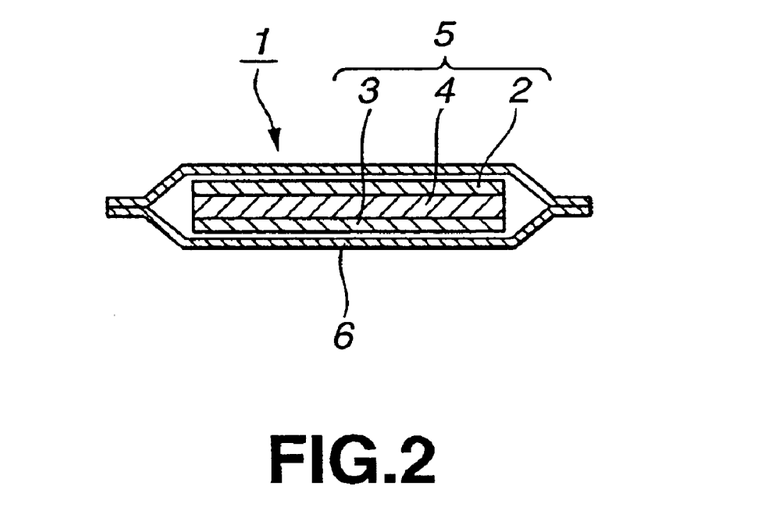
FIG. 2 is a schematic sectional view showing one structural example of the nonaqueous electrolyte battery.

As shown in FIGS. 1 and 2, in a gel electrolyte battery 1, a battery element 5 formed by a cathode 2 and an anode 3 through a gel electrolyte 4 is accommodated in an outer casing film 6. Further, the cathode 2 is connected to a cathode lead 7. The anode 3 is connected to an anode lead 8. The cathode lead 7 and the anode lead 8 are welded to the outer casing film 6 through a resin film 9 and one ends thereof are pulled outside.

The cathode 2 is manufactured by applying a cathode compound mixture including a cathode active material and a binding agent on a current collector and drying the cathode compound mixture. As the current collector, a metallic foil such as an aluminum foil is employed.

As the cathode active material, metallic oxides, metallic sulfides or specific polymers may be utilized depending on the kinds of objective batteries.

For instance, when the lithium battery which makes use of the dissolution and deposition of lithium is employed, metallic sulfides or oxides such as $TiS_2$, $MoS_2$, $NbSe_2$, $V_2O_5$, and further, polymers such as polyacetylene, polypyrrole may be employed.

In the case of a lithium-ion battery subjected to doping/dedoping with lithium ions, can be utilized lithium composite oxides or the like including as a main component $Li_xMO_2$ (here, M indicates one kind or more of transition metals, and x is different depending on the charging and discharging conditions of the battery and is ordinarily 0.05 or more and 1.10 or lower). As the transition metals M constituting the lithium composite oxides, Co, Ni, Mn, or the like are preferable. As the specific examples of the lithium composite oxides, there may be enumerated $LiCoO_2$, $LiNO_2$, $LiNi_yCo_{1-y}O_2$ (here, a relation expressed by $0<y<1$ is established), $LiMn_2O_4$ and $LiMPO_4$ (here, M designates one or more of transition metals such as Fe), or the like.

The lithium composite oxides can generate high voltage and serve as the cathode active materials excellent in energy density. As the cathode active material, a plurality kinds of cathode active materials may be used together. Further, when these cathode active materials are employed to form a cathode active material layer, a well-known conductive agent or a binding agent may be added thereto.

These cathode active materials are applied to one side of the cathode current collector such as aluminum and the applied cathode active materials are dried and the dried product is compressed by a roll press machine to form the cathode active material layer.

The anode 3 is manufactured by applying an anode compound mixture including an anode active material and a binding agent on a current collector and drying the anode compound mixture. A metallic foil such as a copper foil is used as the current collector.

For example, when the lithium battery which makes use of the dissolution and deposition of lithium is employed, can be used metallic lithium, lithium alloy capable of doping/dedoping lithium, or the like as the anode active material.

In the case of the lithium-ion battery subjected to doping/dedoping with lithium ions, non-graphitizable carbon materials or graphite carbon materials can be used. More specifically, carbon materials such as graphites, carbon fibers such as mesophase carbon fibers, pyrocarbons, cokes (pitch coke, needle coke, petroleum coke), vitreous carbons, organic polymer compound sintered body (materials obtained by sintering and carbonizing phenol resin, furan resin, or the like at suitable temperature), and activated carbons, or the like. When the anode is manufactured from these materials, a well-known binding agent or the like can be added thereto.

These anode active materials are applied to one side of the anode current collector such as the copper foil and the anode active materials are dried and then the dried product is compressed by a roll press machine to from an anode active material layer.

The battery element 5 is formed by applying the gel electrolyte 4 excellent in its ionic conductivity even at low temperature on the respective single sides of the cathode 2 and the anode 3, and then, coiling the cathode 2 and the anode 3 while the active material surfaces of the cathode 2 and the anode 3 are made opposite to each other. It is to be understood that the configuration of the battery element 5 is not limited to a coiled type and it may be applied to a zigzag folded type or a laminated type formed by laminating the cathodes and the cathodes with the surfaces to which the gel electrolyte 4 is applied facing each other.

Figure 3:
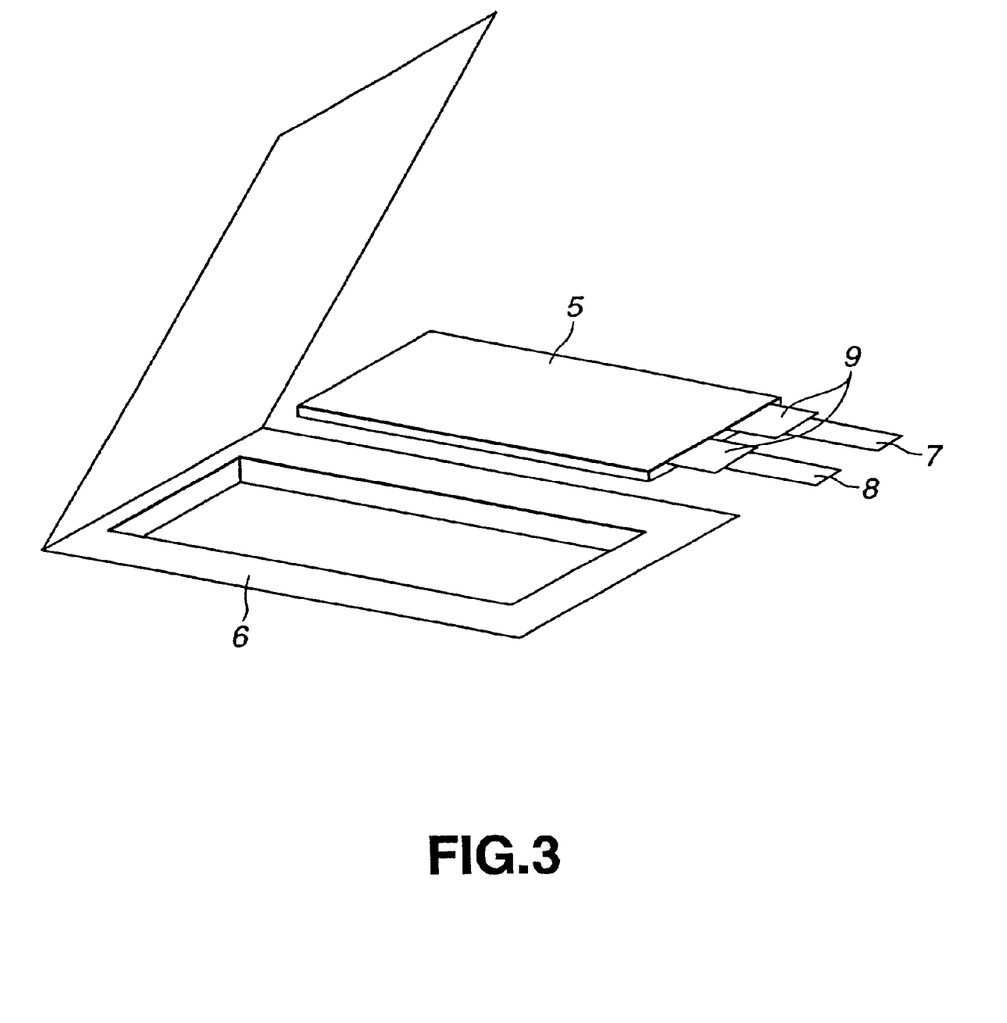
FIG. 3 is a schematic perspective view showing a state in which a battery element is accommodated in an outer casing film.

The outer casing film 6 serves to accommodate the battery element 5 therein as shown in FIG. 3. The outer casing film 6 is composed of a heat seal type sheet shaped laminate film including an outer casing protective layer, an aluminum layer and a heat sealing layer (an innermost layer of the laminate).

In this case, as the materials of the heat sealing layer and the outer protective layer, a plastic film or the like may be exemplified. As for the plastic films for forming the heat sealing layer, polyethylene, polypropylene, nylon (trade name) or the like are employed. Beside, any raw material falling within a scope of a thermoplastic material may be used.

Figure 4:
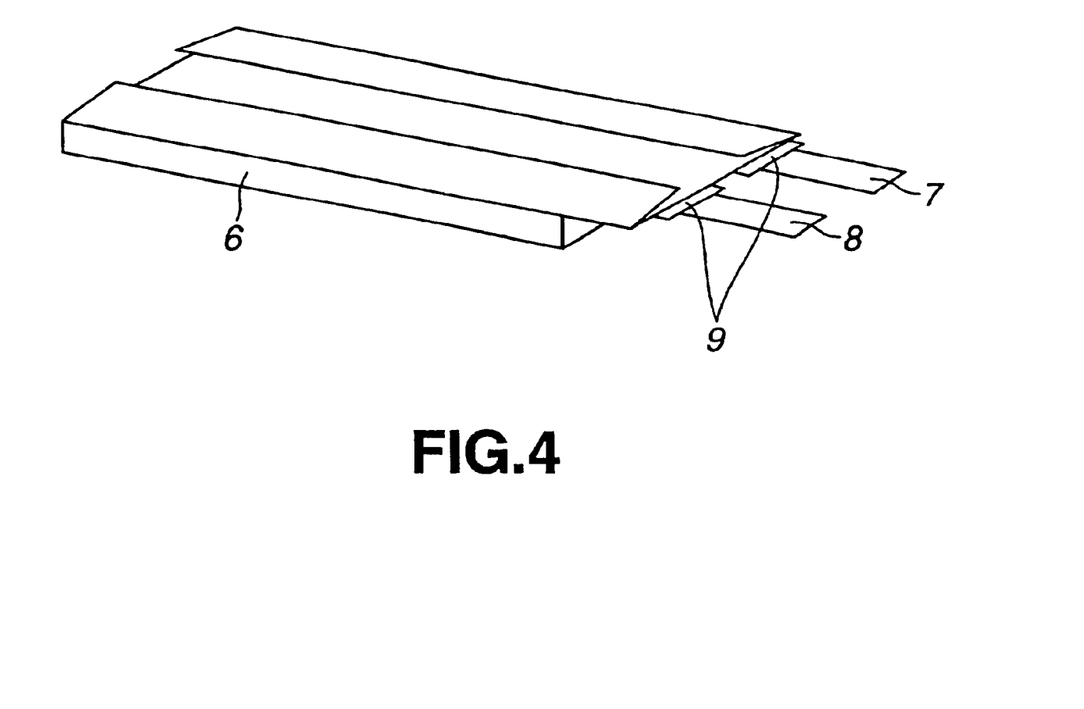
FIG. 4 is a schematic perspective view showing a state in which the peripheral parts of the outer casing film are connected to a bottom surface.
Figure 5:
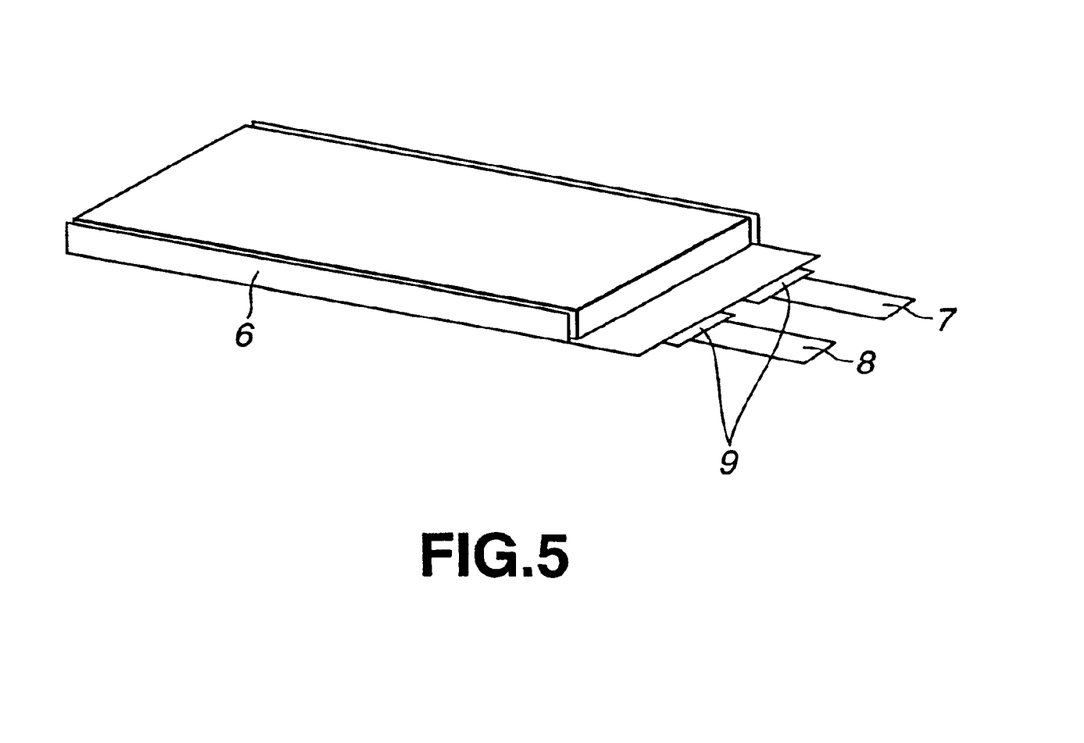
FIG. 5 is a schematic perspective view showing a state in which the peripheral parts of the outer casing film are connected to side surfaces.

Further, according to the present embodiment, although the battery element 5 is subjected to a vacuum packaging by the outer casing film 6, it is to be recognized that a packaging method or a sealing method for peripheral parts is not especially limited. Further, the sealed parts of the peripheral parts may be stuck to the main surface of the battery element 5 as illustrated in FIG. 4, may be stuck to the side surfaces of the battery element 5 in their configurations as illustrated in FIG. 5, or may not be folded as they are.

The cathode lead 7 and the anode lead 8 are respectively connected to the cathode 2 and the anode 3. Then, they are connected to an external devices. As the examples of materials employed for the cathode lead 7, there may be exemplified aluminum, titanium, alloys of them, or the like. As the examples of materials used for the anode lead 8, there may be exemplified copper, nickel or alloys of them, or the like.

Resin films 9 are provided in parts where the outer casing film 6 comes into contact with the cathode lead 7 and the anode lead 8. The resin films 9 are provided so that a short circuit due to the burrs of the outer casing film 6. Further, the contact property between the outer casing film 6 and the cathode lead 7 and the anode lead 8 is improved.

Although, as the materials of the resin film 9, any material showing an adhesive property relative to the cathode lead 7 and the anode lead 8 may be employed without a special limitation, materials composed of polyolefine resin such as polyethylene, polypropylene, modified polyethylene, modified polypropylene and the copolymers of them may be preferably utilized.

According to the nonaqueous electrolyte battery having the above mentioned construction, since the gel electrolyte which uses the carboxylic acid modified vinylidene fluoride copolymer as the matrix polymer is employed, a current characteristic or a low temperature characteristic can be extremely improved while the advantages of the polymer battery that liquid does not leak and the outer casing can be made of the laminate film to realize the compact and light battery are maintained.

EXAMPLES

Now, examples and comparative examples to which the present invention is applied will be described on the basis of experimental examples.

Experiment 1

In this experiment, a matrix polymer comprising, as a main component, a copolymer including the vinylidene fluoride (VdF) and bexafluoropropylene (HFP) as monomer units was used to manufacture a nonaqueous electrolyte battery and the differences in compatibility, liquid retaining characteristic, cyclic characteristic, low temperature characteristic and load characteristic due to the presence or absence of the carboxylic acid modification were examined. Further, the monomer unit ratio of a monomer introduced for the purpose of the carboxylic acid modification relative to the vinylidene fluoride was changed to manufacture the gel electrolyte and the compatibility, the liquid retaining characteristic, the cyclic characteristic, the low temperature characteristic and the load characteristic were examined.

Example 1

Initially, the cathode was manufactured. 92 wt % of $LiCoO_2$, 3 wt % of powdered PVdF, 5 wt % of powdered graphite and N-methyl pyrrolidone (NMP) were first dispersed as solvents. The obtained product was applied to both the surfaces of an aluminum foil as a current collector, the aluminum foil to which the product is applied was dried at 100° C. under reduced pressure for 24 hours. Further, the resultant aluminum foil was pressed by a roll press machine and compressed. The compressed product was cut to a size of 50 mm×300 mm and the cut product was employed as the cathode.

Then, the anode was manufactured. 91 wt % of artificial graphite, 9 wt % of powdered PVdF and the N-methyl pyrrolidone (NMP) were first dispersed as solvents. The mixed product was applied to a copper foil as a current collector and the product applied to the current collector was subjected to a pressure reduction for 24 hours at 120° C. Further, the resultant product was pressed by a roll press machine and compressed. The compressed product was cut so as to have the size of 52 mm×320 mm and the cut product was used as the cathode.

Further, the gel electrolyte was manufactured. After the PVdF copolymer was mixed with dimethyl carbonate (DMC) as a solvent, the obtained mixture was heated and agitated to produce the solution in which the PVdF copolymer was dissolved. In the PVdF copolymer employed here, the hexafluoropropylene (HFP) was copolymerized with the vinylidene fluoride so that the weight ratio of the HFP relative to the vinylidene fluoride is 7% and monomethyl maleate (MMM) was copolymerized with the vinylidene fluoride so that the monomer unit ratio of the MMM relative to the vinylidene fluoride is 25/10000. Then, ethylene carbonate (EC) whose mass is equal to that of diethyl carbonate (DEC) were mixed together to produce a nonaqueous solvent. The PVdF copolymer was obtained by mixing together two kinds of copolymers with the intrinsic viscosity of 2.9 dg/l and 0.9 dg/l in the mass ratio 8:2. Then, $LiPF_6$ was added to the nonaqueous solvent so as to have 1.0 mol/kg relative thereto to produce electrolyte solution. Finally, the PVdF copolymer was mixed with the ethylene carbonate (EC) in the weight ratio 1:2 to obtain a sol electrolyte.

Then, the sol electrolyte was applied respectively to the cathode and the anode by using a bar coater. The solvent was volatilized in a thermostat to form a gel electrolyte. After that, the surfaces of the cathode and the anode to which an active material was applied were made opposite to each other and the cathode and the anode were coiled in a flat shape to manufacture a battery element. This battery element was subjected to a vacuum packaging by a general purpose laminate film formed by sandwiching an aluminum foil in between polyolefine films to obtain a nonaqueous electrolyte battery.

Example 2

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monomethyl maleate (MMM) was copolymerized with the vinylidene fluoride so that the monomer unit ratio of the MMM relative to the vinylidene fluoride was 5/10000.

Example 3

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monomethyl maleate (MMM) was copolymerized with the vinylidene fluoride so that the monomer unit ratio of the MMM relative to the vinylidene fluoride was 50/10000.

Example 4

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monomethyl maleate (MMM) was copolymerized with the vinylidene fluoride so that the monomer unit ratio of the MMM relative to the vinylidene fluoride was 100/10000.

Example 5

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monomethyl maleate (MMM) was copolymerized with the vinylidene fluoride so that the monomer unit ratio of the MMM relative to the vinylidene fluoride was 250/10000.

Example 6

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monomethyl maleate (MMM) was copolymerized with the vinylidene fluoride so that the monomer unit ratio of the MMM relative to the vinylidene fluoride was 1/10000.

Example 7

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monomethyl maleate (MMM) was copolymerized with the vinylidene fluoride so that the monomer unit ratio of the MMM relative to the vinylidene fluoride was 35/1000.

Example 8

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monoethyl maleate (MEM) was copolymerized with the vinylidene fluoride so that the monomer unit ratio of the MEM relative to the vinylidene fluoride was 5/10000.

Example 9

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monoethyl maleate (MEM) was copolymerized with the vinylidene fluoride so that the monomer unit ratio of the MEM relative to the vinylidene fluoride was 50/10000.

Example 10

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monoethyl maleate (MEM) was copolymerized with the vinylidene fluoride so that the monomer unit ratio of the MEM relative to the vinylidene fluoride was 250/10000.

Example 11

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monoethyl maleate (MEM) was copolymerized with the vinylidene fluoride so that the monomer unit ratio of the MEM relative to the vinylidene fluoride was 1/10000.

Example 12

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monoethyl maleate (MEM) was copolymerized with the vinylidene fluoride so that the monomer unit ratio of the MEM relative to the vinylidene fluoride was 35/1000.

Example 13

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monopropyl maleate (MPM) was copolymerized with the vinylidene fluoride so that the monomer unit ratio of the MPM relative to the vinylidene fluoride was 5/10000.

Example 14

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monopropyl maleate (MPM) was copolymerized with the vinylidene fluoride so that the monomer unit ratio of the MPM relative to the vinylidene fluoride was 50/10000.

Example 15

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monopropyl maleate (MPM) was copolymerized with the vinylidene fluoride so that the monomer unit ratio of the MPM relative to the vinylidene fluoride was 250/10000.

Example 16

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monopropyl maleate (MPM) was copolymerized with the vinylidene fluoride so that the monomer unit ratio of the MPM relative to the vinylidene fluoride was 1/10000.

Example 17

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monopropyl maleate (MPM) was copolymerized with the vinylidene fluoride so that the monomer unit ratio of the MPM relative to the vinylidene fluoride was 35/1000.

Example 18

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monobutyl maleate (MBM) was copolymerized with the vinylidene fluoride so that the monomer unit ratio of the MBM relative to the vinylidene fluoride was 5/10000.

Example 19

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monobutyl maleate (MBM) was copolymerized with the vinylidene fluoride so that the monomer unit ratio of the MBM relative to the vinylidene fluoride was 50/10000.

Example 20

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monobutyl maleate (MBM) was copolymerized with the vinylidene fluoride so that the monomer unit ratio of the MBM relative to the vinylidene fluoride was 250/10000.

Example 21

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monobutyl maleate (MBM) was copolymerized with the vinylidene fluoride so that the monomer unit ratio of the MBM relative to the vinylidene fluoride was 1/10000.

Example 22

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monobutyl maleate (MBM) was copolymerized with the vinylidene fluoride so that the monomer unit ratio of the MBM relative to the vinylidene fluoride was 35/1000.

Example 23

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the dimethyl maleate (DMM) was copolymerized with the vinylidene fluoride so that the monomer unit ratio of the DMM relative to the vinylidene fluoride was 25/10000.

Example 24

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the diethyl maleate (DEM) was copolymerized with the vinylidene fluoride so that the monomer unit ratio of the DEM relative to the vinylidene fluoride was 25/10000.

Comparative Example 1

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and, as the nonaqueous solvent, the mixture containing the mass of ethylene carbonate (EC) equal to that of propylene carbonate (PC) was used.

Comparative Example 2

A nonaqueous electrolyte battery was manufactured in the same manner as that of the Example 1 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monomethyl maleate (MMM) was not copolymerized with the vinylidene fluoride.

For the nonaqueous electrolyte batteries manufactured in the Examples 1 to 24 and the Comparative Examples 1 and 2, the compatibility and the liquid retaining property of them were examined in accordance with methods described below and the cyclic characteristic, the low temperature discharging characteristic and the load characteristic were measured.

[Compatibility]

It was recognized whether or not the matrix polymer was dissolved in the nonaqueous solvent to produce homogeneous and transparent solution. If the homogeneous and transparent solution is not produced, a gel will not be produced to generate a problem in the battery performance and liquid will be liable to leak. Accordingly, the battery does not function as the nonaqueous electrolyte battery.

[Liquid Retaining Property]

The manufactured nonaqueous electrolyte batteries were treated by a centrifugal separator for 1 hour under 1600 G to recognize whether or not the liquid of the nonaqueous electrolyte leaked. If the matrix polymer can not sufficiently retain the liquid of the nonaqueous solvent, the gel electrolyte will leak liquid, so that it will hardly maintain its configuration. Further, when the gel electrolyte with no liquid retaining property is employed, the nonaqueous electrolyte battery cannot be formed.

[Cyclic Characteristic]

After the constant-current and constant-voltage charge of 4.2 V and 1 C was carried out, the 3 V cut-off constant-current discharge under 1 C was carried out to measure the deterioration with age of a discharging capacity. Here, 1 C is a current value for discharging the rated capacity of a battery for 1 hour. In this case, the rate of the discharging capacity of a 300th cycle relative to the discharging capacity of a 5th cycle as described below was evaluated and products having the above rate of 85% or more were considered to be good products. When the above described value is 85% or higher, it is judged that conditions required for the general specifications of current electronic devices are satisfied.

(discharging capacity of a 300th cycle)/(discharging capacity of 5th cycle)

[Low Temperature Characteristic]

The rate of discharging capacity of 0.5 C at −20° C. relative to the discharging capacity of 0.5 C at 23° C. as described below was evaluated and products having the rate of 50% or more were considered to be good products. Here, 0.5 C is a current value under which the rated capacity of the battery is discharged for about 2 hours. When the above described value is 50% or higher, this means that the discharging capacity necessary for making an emergent rescue call by a potable telephone or the like at least once in a cold place at about −20° C. is ensured.

(discharging capacity of 0.5 C at −20° C.)/(discharging capacity of 0.5 C at 23° C.)

[Load Characteristic]

The rate of discharging capacity of 3 C relative to the discharging capacity of 0.5 C at room temperature as described below was evaluated and products having the rate of 85% or more were judged to be good products. Here, 3 C designates a current value under which the rated capacity of the battery is discharged for 20 minutes. For instance, since the portable telephone consumes electric power under pulse current, a large amount of current is supplied. When the above described value is 85% or higher, a demand for the portable telephone can be satisfied.

(discharging capacity of 3 C)/(discharging capacity of 0.5 C)

The compatibility or the liquid retaining property, the cyclic characteristic, the low temperature characteristic and the load characteristic were measured respectively for the Examples 1 to 24 and the Comparative Examples 1 and 2. The results of the measurements are shown in Table 1.

TABLE 1

|  | Compatibility | Liquid retaining property |
|---|---|---|
| Example 1 | ○ | ○ |
| Example 2 | ○ | ○ |
| Example 3 | ○ | ○ |
| Example 4 | ○ | ○ |
| Example 5 | ○ | ○ |
| Example 6 | Δx | x |
| Example 7 | Δ | x |
| Example 8 | ○ | ○ |
| Example 9 | ○ | ○ |
| Example 10 | ○ | ○ |
| Example 11 | Δx | x |
| Example 12 | Δ | x |
| Example 13 | ○ | ○ |
| Example 14 | ○ | ○ |
| Example 15 | ○ | ○ |
| Example 16 | Δx | x |
| Example 17 | Δ | x |
| Example 18 | ○ | ○ |
| Example 19 | ○ | ○ |
| Example 20 | ○ | ○ |
| Example 21 | Δx | x |
| Example 22 | Δ | x |
| Example 23 | ○ | ○ |
| Example 24 | ○ | ○ |
| Comparative Example 1 | ○ | ○ |
| Comparative Example 2 | x | x |

|  | Cyclic characteristic (%) | Low temperature characteristic (%) | Load characteristic (%) |
|---|---|---|---|
| Example 1 | 90 | 77 | 92 |
| Example 2 | 88 | 73 | 89 |
| Example 3 | 91 | 76 | 90 |
| Example 4 | 93 | 79 | 91 |
| Example 5 | 95 | 79 | 91 |
| Example 6 | 58 | 39 | 45 |
| Example 7 | 45 | 33 | 56 |
| Example 8 | 87 | 76 | 90 |
| Example 9 | 88 | 77 | 92 |
| Example 10 | 90 | 78 | 92 |
| Example 11 | 62 | 28 | 43 |
| Example 12 | 53 | 35 | 49 |
| Example 13 | 89 | 74 | 88 |
| Example 14 | 93 | 76 | 90 |
| Example 15 | 94 | 76 | 90 |
| Example 16 | 49 | 24 | 37 |
| Example 17 | 55 | 22 | 31 |
| Example 18 | 88 | 73 | 90 |

TABLE 1-continued

| | | | |
|---|---|---|---|
| Example 19 | 91 | 72 | 90 |
| Example 20 | 93 | 75 | 91 |
| Example 21 | 43 | 19 | 28 |
| Example 22 | 56 | 27 | 39 |
| Example 23 | 90 | 73 | 90 |
| Example 24 | 91 | 72 | 91 |
| Comparative Example 1 | 93 | 39 | 88 |
| Comparative Example 2 | 35 | 12 | 61 |

From the Table 1, the following facts can be understood.

Initially, when the solvent of low viscosity is not included as in the Comparative Example 1, the gel electrolyte can be produced even when the polyvinylidene fluoride as the matrix polymer is not subjected to a carboxylic acid modification. However, since the solvent of low viscosity is not contained, it is to be understood that the low temperature characteristic is insufficient.

On the other hand, when the matrix polymer which is not subjected to carboxylic acid modification is combined with the solvent of low viscosity as in the Comparative Example 2, there is no compatibility therebetween so that the gel cannot be produced, the leakage of liquid is generated, and further, the battery performance is not good.

On the contrary, in the respective examples in which the carboxylic acid modified matrix polymer is combined with the solvent of low viscosity, the low temperature characteristics are excellent and troubles due to the leakage of liquid are not generated.

In this case, when the battery performances such as the low temperature characteristic, the cyclic characteristic or the load characteristic, or the like are taken into consideration, it is to be understood that the ratio of the monomer unit for the carboxylic acid modification is preferably set to a proper value.

For example, in the PVdF copolymer obtained from the copolymerization of the monomethyl maleate (MMM), when the MMM is copolymerized with the vinylidene fluoride so that the monomer unit ratio of the MMM relative to the vinylidene fluoride ranges from 25/10000 to 30/1000 as shown in the Examples 1 to 5, the compatibility and the liquid retaining property are excellent and the cyclic characteristic, the low temperature characteristic and the load characteristic are desirable.

On the other hand, as shown in the Example 6, when the monomethyl maleate (MMM) is copolymerized with the vinylidene fluoride so that the monomer unit ratio of the MMM relative to the vinylidene fluoride is smaller than 25/10000, and, as shown in the Example 7, when the MMM is copolymerized with the vinylidene fluoride so that the monomer unit ratio of the MMM relative to the vinylidene fluoride is larger than 30/1000, the compatibility and the liquid retaining property are undesirable and the cyclic characteristic, the low temperature characteristic and the load characteristic are not preferable.

Similarly, in the PVdF copolymer obtained from the copolymerization of the monoethyl maleate (MEM), when the MEM is copolymerized with the vinylidene fluoride so that the monomer unit ratio of the MEM relative to the vinylidene fluoride ranges from 25/10000 to 30/1000, as shown in the Examples 8 to 10, the compatibility and the liquid retaining property are desirable and the cyclic characteristic, the low temperature characteristic and the load characteristic are also preferable.

However, as shown in the Example 11, when the monoethyl maleate (MEM) is copolymerized with the vinylidene fluoride so that the monomer unit ratio of the MEM is smaller than 25/10000, and, when the MEM is copolymerized with the vinylidene fluoride so that the monomer unit ratio of the MEM relative to the vinylidene fluoride is larger than 30/1000, as shown in the Example 12, the compatibility and the liquid retaining property are not desirable and the cyclic characteristic, the low temperature characteristic and the load characteristic are not preferable.

Also in the PVdF copolymer obtained from the copolymerization of the monopropyl maleate (MPM) or the monobutyl maleate (MBM), when the MPM or the MBM is copolymerized with the vinylidene fluoride so that the monomer unit ratio of the MPM or the MBM relative to the vinylidene fluoride ranges from 25/10000 to 30/1000, as shown in the Examples 13 to 15 or the Examples 18 to 20, the compatibility or the liquid retaining property is good and the cyclic characteristic, the low temperature characteristic and the load characteristic are also desirable.

However, as shown in the Example 16 or 21, when the monopropyl maleate (MPM) or the monobutyl maleate (MBM) is copolymerized with the vinylidene fluoride so that the monomer unit ratio of the MPM or the MBM relative to the vinylidene fluoride is not higher than 25/10000, and when the MPM or the MBM is copolymerized with the vinylidene fluoride so that the monomer unit ratio of the MPM or the MBM relative to the vinylidene fluoride is larger than 30/1000, as shown in the Examples 17 and 22, the compatibility and the liquid retaining property are bad and the cyclic characteristic, the low temperature characteristic and the load characteristic are insufficient.

Experiment 2

In this experiment, the gel electrolyte or the nonaqueous electrolyte battery were manufactured in accordance with a method different from that of the experiment 1 and the effects of the carboxylic acid modification were recognized.

Example 25

Initially, the cathode and the anode were manufactured in accordance with the same method as that of the Example 1.

Then, the gel electrolyte was manufactured. The PVdF copolymer was mixed with ethylene carbonate (EC) and propylene carbonate (PC) respectively having equal mass. Then, dimethyl carbonate (DMC) as a solvent was added to the mixture. The obtained mixture was heated and agitated and dissolved therein to produce the solution in a sol state. The PVdF copolymer used here was the same as that used in the Example 1.

Then, the above described solvent in the sol state was applied respectively to the active material layers of the cathode and the anode by using a bar coater. The solvent was volatilized in a thermostat to form a gel film. After that, the surfaces of the active material layers of the cathode and the anode to which an active material was applied were made opposite to each other and the cathode and the anode were coiled in a flat shape to manufacture a battery element.

Further, $LiPF_6$ was added to the solvent obtained by mixing the equal mass of the ethylene carbonate (EC) and the diethyl carbonate (DEC) together so as to have 1.5 mol/kg of $LiPF_6$ to produce the electrolyte solution. Then, the battery element was soaked in the electrolyte solution so that the battery element was impregnated with the electrolyte solution. This battery element was subjected to a vacuum packaging by a general purpose laminate film formed by sandwiching an aluminium foil in between polyolefine films in the same manner as that of the Example 1 to obtain the nonaqueous electrolyte battery.

Example 26

A nonaqueous electrolyte battery was manufactured in the same manner as that of the Example 25 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monoethyl maleate (MEM) was copolymerized with the vinylidene fluoride so that the monomer unit ratio of the MEM relative to the vinylidene fluoride was 25/10000.

Example 27

A nonaqueous electrolyte battery was manufactured in the same manner as that of the Example 25 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monomethyl maleate (MMM) was copolymerized with the vinylidene fluoride so that the monomer unit ratio of the MMM relative to the vinylidene fluoride was 1/10000.

Example 28

A nonaqueous electrolyte battery was manufactured in the same manner as that of the Example 25 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monomethyl maleate (MMM) was copolymerized with the vinylidene fluoride so that the monomer unit ratio of the MMM relative to the vinylidene fluoride was 35/1000.

Example 29

A nonaqueous electrolyte battery was manufactured in the same manner as that of the Example 25 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monoethyl maleate (MEM) was copolymerized with the vinylidene fluoride so that the monomer unit ratio of the MEM relative to the vinylidene fluoride was 1/10000.

Example 30

A nonaqueous electrolyte battery was manufactured in the same manner as that of the Example 25 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monoethyl maleate (MEM) was copolymerized with the vinylidene fluoride so that the monomer unit ratio of the MEM relative to the vinylidene fluoride was 35/1000.

Example 31

A nonaqueous electrolyte battery was manufactured in the same manner as that of the Example 25 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monopropyl maleate (MPM) was copolymerized with the vinylidene fluoride so that the monomer unit ratio of the MPM relative to the vinylidene fluoride was 1/10000.

Example 32

A nonaqueous electrolyte battery was manufactured in the same manner as that of the Example 25 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monopropyl maleate (MPM) was copolymerized with the vinylidene fluoride so that the monomer unit ratio of the MPM relative to the vinylidene fluoride was 35/1000.

Example 33

A nonaqueous electrolyte battery was manufactured in the same manner as that of the Example 25 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monobutyl maleate (MBM) was copolymerized with the vinylidene fluoride so that the monomer unit ratio of the MBM relative to the vinylidene fluoride was 1/10000.

Example 34

A nonaqueous electrolyte battery was manufactured in the same manner as that of the Example 25 except that, a copolymer was used, as the PVdF copolymer, in which the hexafluoropropylene (HFP) was copolymerized with the vinylidene fluoride so that the weight ratio of the HFP relative to the vinylidene fluoride was 7% and the monobutyl maleate (MBM) was copolymerized with the vinylidene fluoride so that the monomer unit ratio of the MBM relative to the vinylidene fluoride was 35/1000.

In the nonaqueous electrolyte batteries manufactured in the Examples 25 to 34, the compatibility and the liquid retaining property were examined in accordance with the above described methods and the cyclic characteristic, the low temperature discharging characteristic and the load characteristic were measured. The results of the measurement were shown in Table 2.

TABLE 2

| | Compatibility | Liquid retaining property |
|---|---|---|
| Example 25 | ◯ | ◯ |
| Example 26 | ◯ | ◯ |
| Example 27 | ◯ | × |
| Example 28 | ◯ | × |
| Example 29 | ◯ | × |
| Example 30 | ◯ | × |
| Example 31 | ◯ | × |
| Example 32 | ◯ | × |
| Example 33 | ◯ | × |
| Example 34 | ◯ | × |

| | Cyclic characteristic (%) | Low temperature characteristic (%) | Load characteristic (%) |
|---|---|---|---|
| Example 25 | 92 | 72 | 93 |
| Example 26 | 89 | 70 | 92 |
| Example 27 | 85 | 32 | 65 |
| Example 28 | 43 | 34 | 44 |
| Example 29 | 83 | 30 | 68 |
| Example 30 | 55 | 29 | 42 |
| Example 31 | 80 | 25 | 71 |
| Example 32 | 51 | 20 | 33 |
| Example 33 | 82 | 22 | 62 |
| Example 34 | 53 | 26 | 34 |

As shown in the Table 2, even when a method for manufacturing the gel electrolyte was changed, in case the vinylidene fluoride was subjected to the carboxylic acid modification, it was recognized that the desired compatibility and liquid retaining property were obtained and the preferable cyclic characteristic, low temperature characteristic and load characteristic were realized.

More specifically, in case the monomethyl maleate (MMM) was copolymerized with the PVdF, when the MMM was copolymerized with the vinylidene fluoride so that monomer unit ratio of the MMM relative to the vinylidene fluoride ranged from 25/10000 to 30/1000 as shown in the Examples 25 and 26, the compatibility and the liquid retaining property were desirable and the cyclic characteristic, the low temperature characteristic and the load characteristic were also excellent.

As in the above described examples, when the method by which the battery element is impregnated with the solvent of low viscosity later is utilized, an amount of maleate acid modification may be low as in the Example 27 until a stage in which the electrolyte solution gels under the ethylene carbonate (EC) and the propylene carbonate (PC). However, when an amount of maleate acid modification is excessively increased as in the Example 28, the compatibility is lowered and the cyclic characteristic or the like is deteriorated. Then, since the liquid of solvent of low viscosity with which the battery element is to be impregnated later is hardly absorbed, the liquid retaining property is decreased and the low temperature characteristic is deteriorated in these examples.

Experiment 3

In this experiment, the materials of the cathode, the anode, the electrolyte salt and the nonaqueous solvent were changed to manufacture the nonaqueous electrolyte batteries. Then, the compatibility, the liquid retaining property, the cyclic characteristic, the low temperature characteristic and the load characteristic were examined.

Example 35

The nonaqueous electrolyte battery was manufactured in the same manner as that of the Example 1 except that non-graphitizable carbon was used for the anode in place of artificial graphite and $Li_{0.7}Co_{0.2}$ was used for the cathode in place of $LiCoO_2$.

Example 36

The nonaqueous electrolyte battery was manufactured in the same manner as that of the Example 1 except that $LiN(C_2F_5)_2$ was used as the electrolyte salt.

Example 37

The nonaqueous electrolyte battery was manufactured in the same manner as that of the Example 1 except that the mixture of the same mass of the ethylene carbonate (EC) and the ethyl methyl carbonate (EMC) was used as the nonaqueous solvent.

Example 38

The nonaqueous electrolyte battery was manufactured in the same manner as that of the Example 1 except that the mixture of the same mass of the ethylene carbonate (EC) and the dimethyl carbonate (DMC) was employed as the nonaqueous solvent.

Example 39

The nonaqueous electrolyte battery was manufactured in the same manner as that of the Example 1 except that the mixture obtained by mixing ethylene carbonate (EC), propylene carbonate (PC), ethyl methyl carbonate (EMC) and diethyl carbonate (DEC) together in the mass ratio 35:10:30:25 was employed and $LiPF_6$ was added to the nonaqueous solvent so as to have 1.3 mol/kg relative thereto.

In the nonaqueous electrolyte batteries manufactured in the Examples 35 to 39, the compatibility and the liquid retaining property were examined in accordance with the above described methods and the cyclic characteristic, the low temperature discharging characteristic and the load characteristic were measured. The results of the measurement were shown in Table 3.

TABLE 3

|  | Compatibility | Liquid retaining property |
| --- | --- | --- |
| Example 35 | ○ | ○ |
| Example 36 | ○ | ○ |
| Example 37 | ○ | ○ |
| Example 38 | ○ | ○ |
| Example 39 | ○ | ○ |

|  | Cyclic characteristic (%) | Low temperature characteristic (%) | Load characteristic (%) |
| --- | --- | --- | --- |
| Example 35 | 96 | 79 | 93 |
| Example 36 | 87 | 68 | 87 |
| Example 37 | 90 | 75 | 94 |
| Example 38 | 89 | 69 | 93 |
| Example 39 | 91 | 73 | 96 |

As shown in the Table 3, even when the nonaqueous electrolyte batteries are manufactured by changing the materials of the cathode, the cathode, the electrolyte salt and the nonaqueous solvent, in case the carboxylic acid modification is applied to the PVdF copolymer so that the monomer unit ratio of the material relative to the vinylidene fluoride ranges 25/10000 to 30/1000, it is recognized that the compatibility and the liquid retaining property are desirable and the cyclic characteristic, the low temperature characteristic and the load characteristic are also preferable.

Experiment 4

In this experiment, the nonaqueous electrolyte battery was manufactured by using the gel electrolyte in which the molecular weight (intrinsic viscosity notation) of the PVdF copolymer was changed, and then, the compatibility, the liquid retaining property, the cyclic characteristic, the low temperature characteristic and the load characteristic were examined.

Example 40

A nonaqueous electrolyte battery manufactured in this Example is the same as that of the Example 1. The intrinsic viscosity of copolymers used in the gel electrolyte was 2.9 dg/l and 1.0 dg/l.

Example 41

A nonaqueous electrolyte battery was manufactured in the same manner as that of the Example 1 except that, a copolymer was used, as the PVdF copolymer, in which the intrinsic viscosity was 3.3 dg/l, the hexafluoropropylene (HFP) was copolymerized with the principal chain of the vinylidene fluoride so that the weight ratio of the HFP relative to the vinylidene fluoride was 7% and the monomethyl maleate (MMM) was copolymerized with the vinylidene fluoride so that the monomer unit ratio of the MMM relative to the vinylidene fluoride was 25/10000.

Example 42

A nonaqueous electrolyte battery was manufactured in the same manner as that of the Example 1 except that, a copolymer was used, as the PVdF copolymer, in which the intrinsic viscosity was 0.7 dg/l, the hexafluoropropylene (HFP) was copolymerized with the principal chain of the vinylidene fluoride so that the weight ratio of the HFP relative to the vinylidene fluoride was 7% and the monomethyl maleate (MMM) was copolymerized with the vinylidene fluoride so that the monomer unit ratio of the MMM relative to the vinylidene fluoride was 25/10000.

In the nonaqueous electrolyte batteries manufactured in the Examples 40 to 42, the compatibility and the liquid retaining property were examined in accordance with the above described methods and the cyclic characteristic, the low temperature discharging characteristic and the load characteristic were measured. The results of the measurement were shown in Table 4.

TABLE 4

|  | Compatibility | Liquid retaining property |
| --- | --- | --- |
| Example 40 | ○ | × |
| Example 41 | ○ | × |
| Example 42 | ○ | × |

|  | Cyclic characteristic (%) | Low temperature characteristic (%) | Load characteristic (%) |
| --- | --- | --- | --- |
| Example 40 | 90 | 77 | 92 |
| Example 41 | 56 | 41 | 53 |
| Example 42 | 44 | 46 | 60 |

As apparent from the Table 4, when the molecular weight of the copolymer used as the matrix polymer exceeds 3 dg/l on the basis of the intrinsic viscosity, it is difficult to dissolve the solvent therein so that a trouble is generated in the battery performance. On the contrary, when the molecular weight of the copolymer used as the matrix polymer is lower than 0.8 dg/l on the basis of the intrinsic viscosity, the copolymer cannot produce gel with self-retaining property and liquid retaining property to cause a trouble in the battery performance.

As can be understood from the above description, in the gel electrolyte of the present invention, since the carboxylic acid modified polyvinylidene fluoride copolymer is used as the matrix polymer, the solvent of low viscosity having a low boiling point can be dissolved therein and the liquid can be retained to improve the ionic conductivity.

Therefore, in the nonaqueous electrolyte battery using the gel electrolyte, since the liquid does not leak and the outer casing can be composed of the laminate film, the current characteristic or the low temperature characteristic can be improved while the advantages of a compact and thin polymer battery can be maintained.

What is claimed is:

1. A gel electrolyte comprising:
   a nonaqueous electrolyte solution comprising an electrolyte salt containing Li and nonaqueous solvent, and
   a matrix polymer prepared by polymerizing monomers, the monomers comprising:
   vinylidene fluoride;
   hexafluoropropylene; and
   a carboxyl moiety containing monomer,
   wherein the matrix polymer is an ester, a carboxylic acid anhydride or both.

2. The gel electrolyte according to claim 1, wherein the carboxyl moiety containing monomer is expressed by a chemical formula 1 and/or a chemical formula 2 shown below (here, R indicates any one selected from the group consisting H, $CH_3$, $C_2H_5$, $C_3H_1$, $C_4H_9$, and $C_5H_{11}$)

[Chemical Formula 1]

[Chemical Formula 2]

3. The gel electrolyte according to claim 1, wherein a structure indicated the carboxyl moiety containing monomer is expressed by a chemical formula 3 and/or a chemical formula 4 shown below (here, $R_1$ and $R_2$ respectively designate any one selected from the group consisting of H, $CH_3$, $C_2H_5$, $C_3H_7$, $C_4H_9$, and $C_5H_{11}$)

[Chemical Formula 3]

[Chemical Formula 4]

4. The gel electrolyte according to claim 1, wherein the carboxyl moiety containing monomer unit is selected from the group consisting of maleic acid, ester maleate and maleic anhydride.

5. The gel electrolyte according to claim 1, wherein the vinylidene fluoride is polymerized with the carboxyl moiety containing monomer with a ratio within a range of 25/10000 to 30/1000.

6. The gel electrolyte according to claim 1, wherein molecular weight of said carboxyl moiety containing monomer ranges from 0.8 dl/g to 3.0 dl/g on the basis of an intrinsic viscosity notation.

7. Nonaqueous electrolyte battery
   an anode,
   a cathode,
   a nonaqueous electrolyte solution comprising an electrolyte salt containing Li and a nonaqueous solvent, and
   a matrix polymer prepared by polymerizing monomers, the monomers comprising:
   vinylidene fluoride;
   hexafluoropropylene; and
   a carboxyl moiety containing monomer,
   wherein the matrix polymer is an ester, a carboxylic acid anhydride or both.

8. The nonaqueous electrolyte battery according to claim 7, wherein said anode includes at least one kind of carbon material selected from the group consisting of lithium metal, lithium alloy and a carbon material capable of being doped/dedoped with lithium.

9. The nonaqueous electrolyte battery according to claim 7, wherein said cathode includes a composite oxide consisted of lithium and transition metals.

10. The nonaqueous electrolyte battery according to claim 7, wherein the carboxyl moiety containing monomer is expressed by a chemical formula 5 and/or a chemical formula 6 shown below (here, R indicates any one selected from the group consisting of H, $CH_3$, $C_2H_5$, $C_3H_7$, $C_4H_9$, and $C_5H_{11}$)

[Chemical Formula 5]

[Chemical Formula 6]

11. The nonaqueous electrolyte battery according to claim 7 wherein the carboxyl moiety containing monomer is expressed by a chemical formula 7 and/or a chemical formula 8 shown below (here, $R_1$ and $R_2$ respectively designate any one selected from the group consisting of H, $CH_3$, $C_2H_5$, $C_3H_7$, $C_4H_9$, and $C_5H_{11}$)

[Chemical Formula 7]

[Chemical Formula 8]

12. The nonaqueous electrolyte battery according to claim 7, wherein the carboxyl moiety containing monomer unit is selected from the group consisting of maleic acid, ester maleate and maleic anhydride.

13. The nonaqueous electrolyte battery according to claim 7, wherein the vinylidene fluoride is polymerized with the carboxyl moiety containing monomer with a ratio within a range of 25/10000 to 30/1000.

14. The nonaqueous electrolyte battery according to claim 7, wherein the molecular weight of said copolymer ranges from 0.8 dl/g to 3.0 dl/g on the basis of an intrinsic viscosity notation.

\* \* \* \* \*